US007246162B2

(12) United States Patent
Tindal

(10) Patent No.: US 7,246,162 B2
(45) Date of Patent: Jul. 17, 2007

(54) SYSTEM AND METHOD FOR CONFIGURING A NETWORK DEVICE

(75) Inventor: Glen D. Tindal, Colorado Springs, CO (US)

(73) Assignee: Intelliden, Colorado Springs, CO (US)

( * ) Notice: Subject to any disclaimer, the term of this patent is extended or adjusted under 35 U.S.C. 154(b) by 0 days.

(21) Appl. No.: 11/216,481

(22) Filed: Aug. 31, 2005

(65) Prior Publication Data

US 2006/0031434 A1 Feb. 9, 2006

Related U.S. Application Data

(63) Continuation of application No. 09/799,579, filed on Mar. 6, 2001, now Pat. No. 6,978,301.

(51) Int. Cl.
*G06F 15/173* (2006.01)

(52) U.S. Cl. .................... 709/223; 709/201; 709/220; 709/238; 719/318

(58) Field of Classification Search ........ 709/200–203, 709/220–224, 238–242; 710/10; 719/318
See application file for complete search history.

(56) References Cited

U.S. PATENT DOCUMENTS

| | | | |
|---|---|---|---|
| 5,506,966 A | 4/1996 | Ban | |
| 5,535,335 A | 7/1996 | Cox | |
| 5,659,746 A | 8/1997 | Bankert | |
| 5,680,551 A | 10/1997 | Martin | |
| 5,751,965 A | 5/1998 | Mayo | |
| 5,812,768 A | 9/1998 | Page | |
| 5,819,042 A | 10/1998 | Hansen | |
| 5,832,503 A * | 11/1998 | Malik et al. ................ 709/223 |
| 5,878,432 A | 3/1999 | Misheski | |
| 5,889,943 A | 3/1999 | Ji | |
| 5,901,320 A | 5/1999 | Takahashi | |

(Continued)

FOREIGN PATENT DOCUMENTS

EP 745929 A1 12/1996

(Continued)

OTHER PUBLICATIONS

NOMS, IEEE 1992 Network Operations and Management Symposium, 1992, vol. 1, IEEE Communications Society, New York, USA.

(Continued)

*Primary Examiner*—Bharat Barot
(74) *Attorney, Agent, or Firm*—Cooley Godward Kronish LLP

(57) ABSTRACT

A system and method for communicating with network devices without regard to the device type and/or manufacturer is described. In one embodiment, the present invention provides a global graphical user interface (GUI) for communicating with various network devices. The global GUI includes an intuitive interface driven by a template library. For each device type and each device manufacturer, this template library can store both the attribute fields required for device configuration and the format for communicating those attribute fields. When a network administrator wants to communicate with a particular network device, the template associated with that device can be retrieved from the template library. The network administrator can then populate the attribute fields of that template with the appropriate data. This attribute data can be formatted and provided to the network device.

13 Claims, 9 Drawing Sheets

U.S. PATENT DOCUMENTS

| | | |
|---|---|---|
| 5,923,850 A | 7/1999 | Barroux |
| 5,999,948 A | 12/1999 | Nelson |
| 6,014,697 A | 1/2000 | Lewis |
| 6,085,253 A | 7/2000 | Blackwell |
| 6,088,804 A | 7/2000 | Hill |
| 6,173,312 B1 | 1/2001 | Atarashi |
| 6,211,877 B1 | 4/2001 | Steele |
| 6,226,654 B1 | 5/2001 | Van Hoff |
| 6,240,458 B1 | 5/2001 | Gilbertson |
| 6,243,815 B1 | 6/2001 | Antur |
| 6,247,049 B1 | 6/2001 | Scott |
| 6,253,240 B1 | 6/2001 | Axberg |
| 6,272,526 B1 | 8/2001 | Robinson |
| 6,286,038 B1 | 9/2001 | Reichmeyer |
| 6,338,149 B1 | 1/2002 | Ciccone |
| 6,363,421 B2 | 3/2002 | Barker |
| 6,374,293 B1 | 4/2002 | Dev |
| 6,426,959 B1 | 7/2002 | Jacobson |
| 6,449,646 B1 | 9/2002 | Sikora |
| 6,453,255 B1 | 9/2002 | Smorodinsky |
| 6,466,580 B1 | 10/2002 | Leung |
| 6,470,453 B1 | 10/2002 | Vilhuber |
| 6,473,775 B1 | 10/2002 | Kusters |
| 6,496,858 B1 | 12/2002 | Frailong |
| 6,513,058 B2 * | 1/2003 | Brown et al. ............... 709/201 |
| 6,546,416 B1 | 4/2003 | Kirsch |
| 6,564,056 B1 | 5/2003 | Fitzgerald |
| 6,571,285 B1 * | 5/2003 | Groath et al. ............... 709/223 |
| 6,598,177 B1 | 7/2003 | Jones |
| 6,609,108 B1 * | 8/2003 | Pulliam et al. ............... 705/27 |
| 6,615,218 B2 | 9/2003 | Mandal |
| 6,628,304 B2 | 9/2003 | Mitchell |
| 6,643,289 B1 | 11/2003 | Natanson |
| 6,678,370 B1 | 1/2004 | Freebersyser |
| 6,684,241 B1 | 1/2004 | Sandick |
| 6,725,262 B1 | 4/2004 | Choquier |
| 6,725,264 B1 | 4/2004 | Christy |
| 6,732,175 B1 | 5/2004 | Abjanic |
| 6,738,910 B1 | 5/2004 | Genty |
| 6,760,761 B1 | 7/2004 | Sciacca |
| 6,760,767 B1 | 7/2004 | Miesbauer |
| 6,766,369 B1 | 7/2004 | Haitsuka |
| 6,772,206 B1 | 8/2004 | Lowry |
| 6,782,474 B1 | 8/2004 | Ylonen |
| 6,810,427 B1 | 10/2004 | Cain |
| 6,816,897 B2 | 11/2004 | McGuire |
| 6,832,247 B1 | 12/2004 | Cochran |
| 6,834,298 B1 | 12/2004 | Singer |
| 6,847,994 B1 | 1/2005 | Akimoto |
| 6,862,708 B1 * | 3/2005 | Higginbotham et al. .... 709/200 |
| 6,865,673 B1 | 3/2005 | Nessett |
| 6,895,431 B1 | 5/2005 | Bero |
| 6,895,588 B1 | 5/2005 | Ruberg |
| 6,907,572 B2 | 6/2005 | Little |
| 6,931,016 B1 | 8/2005 | Andersson |
| 6,931,444 B2 | 8/2005 | Schweitzer |
| 6,938,079 B1 | 8/2005 | Anderson |
| 6,959,332 B1 | 10/2005 | Zavalkovsky |
| 6,978,301 B2 * | 12/2005 | Tindal ........................ 709/223 |
| 6,990,591 B1 | 1/2006 | Pearson |
| 7,003,560 B1 | 2/2006 | Mullen |
| 7,016,955 B2 | 3/2006 | Martin |
| 7,127,526 B1 | 10/2006 | Duncan |
| 7,131,066 B1 * | 10/2006 | Birsan et al. ............... 709/201 |
| 7,143,442 B2 * | 11/2006 | Scarfe et al. ................. 726/23 |
| 7,145,871 B2 | 12/2006 | Levy |
| 2001/0034771 A1 | 10/2001 | Hutsch |
| 2001/0053991 A1 | 12/2001 | Bonabeau |
| 2002/0007411 A1 | 1/2002 | Shaked |
| 2002/0032775 A1 | 3/2002 | Venkataramaiah |
| 2002/0032871 A1 | 3/2002 | Malan |
| 2002/0052719 A1 | 5/2002 | Alexander |
| 2002/0069143 A1 | 6/2002 | Cepeda |
| 2002/0072956 A1 | 6/2002 | Willems |
| 2002/0078068 A1 | 6/2002 | Krishnaprasad |
| 2002/0078382 A1 | 6/2002 | Sheikh |
| 2002/0143927 A1 | 10/2002 | Maltz |
| 2002/0161863 A1 | 10/2002 | McGuire |
| 2002/0169858 A1 | 11/2002 | Bellinger |
| 2002/0173997 A1 | 11/2002 | Menard |
| 2002/0194289 A1 | 12/2002 | Engel |
| 2003/0016685 A1 | 1/2003 | Berggreen |
| 2003/0018702 A1 | 1/2003 | Broughton |
| 2003/0018765 A1 | 1/2003 | Muhlestein |
| 2003/0061312 A1 | 3/2003 | Bodner |
| 2003/0065919 A1 | 4/2003 | Albert |
| 2003/0084009 A1 | 5/2003 | Bigus |
| 2003/0135547 A1 | 7/2003 | Kent |
| 2003/0158894 A1 | 8/2003 | Ziserman |
| 2003/0187964 A1 | 10/2003 | Sage |
| 2003/0200459 A1 | 10/2003 | Seeman |
| 2004/0001493 A1 | 1/2004 | Cloonan |
| 2004/0015592 A1 | 1/2004 | Selgas |
| 2004/0024736 A1 | 2/2004 | Sakamoto |

FOREIGN PATENT DOCUMENTS

| | | |
|---|---|---|
| EP | 0952521 A2 | 10/1999 |
| JP | 8139757 A | 5/1996 |

OTHER PUBLICATIONS

HP OpenView for Windows Workgroup Node Manager User Guide, 3COM, Jan. 1997, Part No. 09-1114-000, Hewlett-Packard Co., Santa Clara, CA USA.

Administrator's Guide, Formulator 3.0, 2000-2002, Gold Wire Technology Inc.

User Guide, Formulator 1.0, 2000-2001, Gold Wire Technology Inc.

Superstack II Hub TR Network Management Module Installation Guide, 3COM Jan. 1997, Hewlett-Packard Co., Santa Clara, CA USA.

Initially Configuring the ATM Switch Router, Cisco, Oct. 19, 2000, pp. 1-42.

Common Information Model—A Developer's Perspecti ve, IEEE, 1998, p. 1.

Liu, Stephen, Cisco IOS Command Line Interface Tutorial, 1997, Small/Medium Business Solutions.

Yeong et al., Lightweight Directory Access Protocol, RFC 1487, Jul. 1993.

* cited by examiner

SYSTEM AND METHOD FOR CONFIGURING A NETWORK DEVICE

PRIORITY

The present application is a continuation application of commonly owned and assigned application Ser. No. 09/799,579, entitled SYSTEM AND METHOD FOR CONFIGURING A NETWORK DEVICE, filed on Mar. 6, 2001 now U.S. Pat. No. 6,978,301, which is incorporated herein by reference.

RELATED APPLICATIONS

The following commonly owned and assigned patent applications are hereby incorporated by reference in their entirety:

Patent application Ser. No. 09/730,864, entitled System and Method for Configuration, Management and Monitoring of Network Resources, filed on Dec. 6, 2000;

Patent application Ser. No. 09/730,680, entitled System and Method for Redirecting Data Generated by Network Devices, filed on Dec. 6, 2000;

Patent application Ser. No. 09/730,863, entitled Event Manager for Network Operating System, filed on Dec. 6, 2000;

Patent application Ser. No. 09/730,671, entitled Dynamic Configuration of Network Devices to Enable Data Transfers, filed on Dec. 6, 2000, now U.S. Pat. No. 7,054,946; and Patent application Ser. No. 09/730,682, entitled Network Operating System Data Directory, filed on Dec. 6, 2000.

Patent application Ser. No. 11/216,482, entitled SYSTEM AND METHOD FOR CONFIGURING A NETWORK DEVICE, filed herewith, which is incorporated herein by reference.

FIELD OF THE INVENTION

The present invention relates generally to network systems. More particularly, but not by way of limitation, the present invention relates to systems and methods for configuring, managing and monitoring network resources such as routers, optical devices and storage devices.

BACKGROUND OF THE INVENTION

With the ever-increasing reliance upon electronic data, businesses are becoming more and more reliant upon those networks responsible for distributing that data. Unfortunately, the rapid growth in the amount of data consumed by businesses has outpaced the development and growth of certain necessary network infrastructure components. One reason that the development and growth of the network infrastructure has lagged behind centers on the present difficulty in expanding, configuring, and reconfiguring existing networks. Even the most routine network expansions and reconfigurations, for example, require significant, highly technical, manual intervention by trained network administrators. Unfortunately, these highly trained network administrators are in extremely short supply. Thus, many needed network expansions and reconfigurations are delayed or even completely avoided because of the inability to find the needed administrators to perform the required laborious, technical tasks.

The present difficulty in configuring and reconfiguring networks is best illustrated by an example directed toward installing a single new router on an existing network. To install a new router (such as router 100 or 105 in FIG. 1), an administrator 110 first would need to choose a particular router with the best attributes for the network. The basic configuration of the new router generally will be defined by its manufacturer and its model. Although it would seem that the router should be chosen based upon its attributes, administrators 110 often choose a router based upon the identity of its manufacturer and the administrators' ability to configure devices from that manufacturer. Administrators 110, for example, may only know how to configure and operate devices manufactured by Cisco Systems, Inc. and may overlook equal or even superior devices from other manufacturers merely because they cannot or have not been trained to configure them.

After the administrator 110 has chosen the desired router (router 105, for example), the administrator 110 generally will order the router 105 from the manufacturer and have it shipped, not necessarily to the installation site, but rather to the administrator's site where a basic configuration can be installed. The administrator 110 then ships the router 105 to the installation site where it can be physically installed. After the router 105 has been physically installed, the administrator 110 typically is manually notified, e.g., by telephone, that the router 105 is connected to the network. The administrator must then create a set of device-specific commands required to fully configure the router 105 and transfer those commands to the router's memory 115. After the administrator 110 verifies that the device-specific commands were installed correctly, the router 105 can be brought online.

Obviously, the steps required for an administrator to configure a single router are quite cumbersome and require significant technical skill. The problem, however, is even more severe when the administrator desires to simultaneously configure or reconfigure several network devices. First, the administrator, for example, would need to manually identify the network devices that need to be configured or reconfigured. For example, if the administrator desired to turn up service between two points, the administrator would need to identify the routers along the path between the two points. The administrator would then need to verify that the policies and rules established for the network permit the contemplated reconfiguration for those devices. Assuming that the reconfiguration is within the network's policies and rules, the administrator would need to create the device-specific code required to reconfigure each of the identified devices. In many instances, the same device-specific code cannot be used on all of the devices. For example, the device-specific commands required to reconfigure a Cisco™ router differ significantly from the device-specific commands required to reconfigure a Juniper™ router. Thus, if the identified network devices include both Cisco™ and Juniper™ routers, the administrator would be required to create different versions of the device-specific commands, thereby significantly increasing the chance for error in the reconfiguration process.

Once the device-specific commands have been created for each of the identified network devices, the commands must be manually transmitted to each device. That is, a connection, e.g., a telnet connection, must be established to each device and the particular commands transferred thereto. After each device has received its commands, the network administrator must manually reconnect to each device and verify that the device received the proper commands and that it is operating properly.

Although some tools have been developed to help administrators perform certain ones of the laborious tasks of network management, these tools are extremely limited in their application. For example, CiscoWorks™ is a group of unrelated tools that can aid administrators in some enterprise level tasks. CiscoWorks™ and similar tools provide singularly focused, unrelated tools to perform activities such as quality of service (QOS) provisioning and network policy management. These tools do not provide a way to interrelate the various happenings in a network. In essence, these present network tools lack a holistic approach to network administration.

Moreover, tools like CiscoWorks™ are generally dedicated to the management of one type of network device, e.g., router or optical device, and one brand of network device. For example, CiscoWorks™ does not help an administrator configure a Juniper™ router, and it does not help an administrator configure optical devices. Thus, if the network has both Cisco™ and Juniper™ devices, multiple unrelated tools must be utilized to perform basic network management tasks. Unfortunately, because these multiple unrelated tools are so difficult to manage, network administrators are prone to select routers based upon manufacturer identity rather than upon device features.

In addition to several other drawbacks, these singularly focused network tools result in substandard fault detection and recovery. For example, in present systems, once a configuration is changed, there is no easy way to "back out" of that configuration if a problem arises. Presently, if a new configuration for a target device fails, the network administrator would be forced to recreate the device-specific commands of the target device's previous configuration, manually connect to the device and then transmit the recreated device-specific commands to the device. As can be appreciated, this process can be extremely time consuming and error prone.

Another drawback to existing network technology centers on the multitude of different interfaces that a network administrator must navigate to configure various network devices. Presently, each network device manufacturer uses its own distinct interface for communicating with its network devices. For example, a network administrator would use a first interface for communicating with a Ciena Corporation (hereinafter "Ciena") optical device and a second interface for communicating with a Nortel™ optical device. Because, these interfaces may have very little in common, the network administrator would be required to spend a great deal of time learning both interfaces.

The burden on a network administrator increases dramatically when he needs to communicate with different types of devices manufactured by different companies. In many networks, an administrator could be required to communicate with routers, optical devices, and storage devices—all manufactured by different companies. Thus, a network administrator faces the daunting task of learning and using the distinct interfaces created by each of these manufacturers.

To date, each network device manufacture unfortunately has focused on building its own interface and making its own product easier to use. In other words, network device manufactures have focused on developing their own software platforms to operate their own network devices. Device manufactures, as would be expected, have not focused on an integrated software platform that will operate devices of different types and/or from different manufactures. There is no motivation for a company like Nortel™ to aid a network administrator in configuring a device from its competitor, Ciena.

The lack of an integrated software platform for communicating with, operating and/or configuring various network devices has led to the slowed expansion of existing networks. Because network administrators shy away from purchasing network devices that require them to undergo additional training, the lack of such an integrated software platform prevents new device manufactures from entering the market. Moreover, lack of such an integrated software platform prevents new network providers from entering the market because they cannot find trained personnel that can operate the distinct interfaces developed by the various network device manufactures. Accordingly, an integrated network software platform is needed. In particular, a system and method are needed for communicating with network devices without regard to the device type and/or manufacturer.

SUMMARY OF THE INVENTION

In one innovative aspect, a system and method for communicating with network devices without regard to the device type and/or manufacturer is disclosed. In one embodiment, the present invention provides a global graphical user interface (GUI) for communicating with various network devices. Thus, instead of being forced to learn different interfaces for different network devices, a network administrator, using the present invention, can learn a single global GUI and communicate with the various types and brands of network devices.

Although the global GUI can be constructed in a variety of ways, good results have been achieved by using an intuitive interface driven by a template library. For each device type and each device manufacturer, this template library can store both the attribute fields required for device configuration and the format for communicating those attribute fields. For example, one template could be designed for Cisco™ routers, another for Juniper™ routers, and another for EMC™ storage devices. Moreover, different templates could even be designed for different models of, for example, a particular manufacturer's device.

When a network administrator wants to communicate with a particular network device, the template associated with that device can be retrieved from the template library. The network administrator can then populate the attribute fields of that template with the appropriate data. Because the global GUI can automatically format the data received from the network administrator, the network administrator can use the same format for the attribute fields across different network devices. In other words, through the present invention, network administrators will not be forced to learn the syntax for different network devices. Rather, the network administrator only needs to learn the syntax for the global GUI, which can "translate" instructions into the proper form and provide those "translated" instructions to the appropriate network device.

Although the global GUI can be operated independently, good results have been achieved by integrating the global GUI with a directory-enabled network system. For example, the global GUI can be integrated with a network manager unit that is disposed between the network administrator and the various network devices. The network manger unit can include, among other things, a central repository for storing configuration records for each of the attached network devices. In this type of system, the global GUI can be used to configure or reconfigure a configuration record associated with any type or brand of network device. The data in the configuration record can then be used to populate the attribute fields in the template, and the populated fields can be formatted and provided to the appropriate network device. In yet other embodiments, the configuration records and templates can be combined to form a single data structure.

As can be appreciated by those skilled in the art, the present invention addresses significant shortfalls in present network technology. In particular, the present invention, provides a way to configure, manage and view an entire network system. These and other advantages of the present invention are described more fully herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
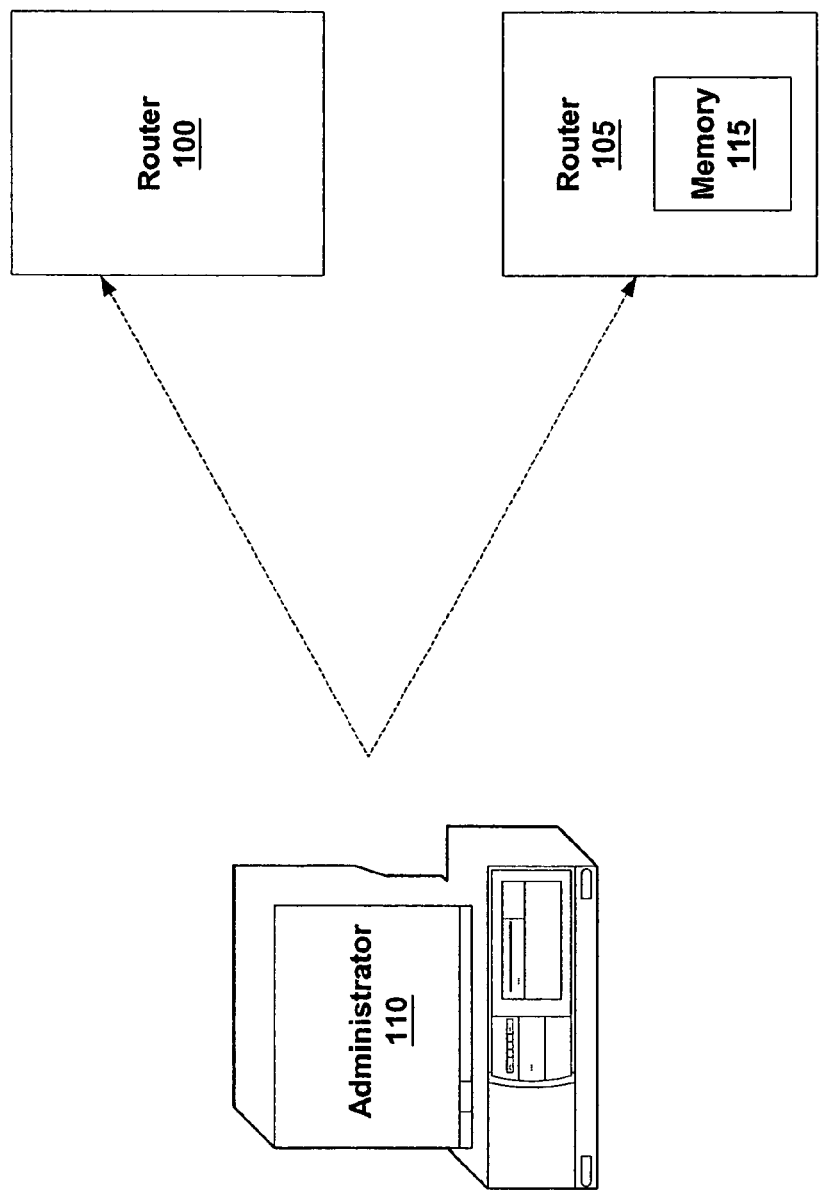
FIG. 1 illustrates a present system for configuring network routers.

Although the present invention is open to various modifications and alternative constructions, a preferred exemplary embodiment that is shown in the drawings is described herein in detail. It is to be understood, however, that there is no intention to limit the invention to the particular forms disclosed. One skilled in the art can recognize that there are numerous modifications, equivalents, and alternative constructions that fall within the spirit and scope of the invention as expressed in the claims.

Figure 2:
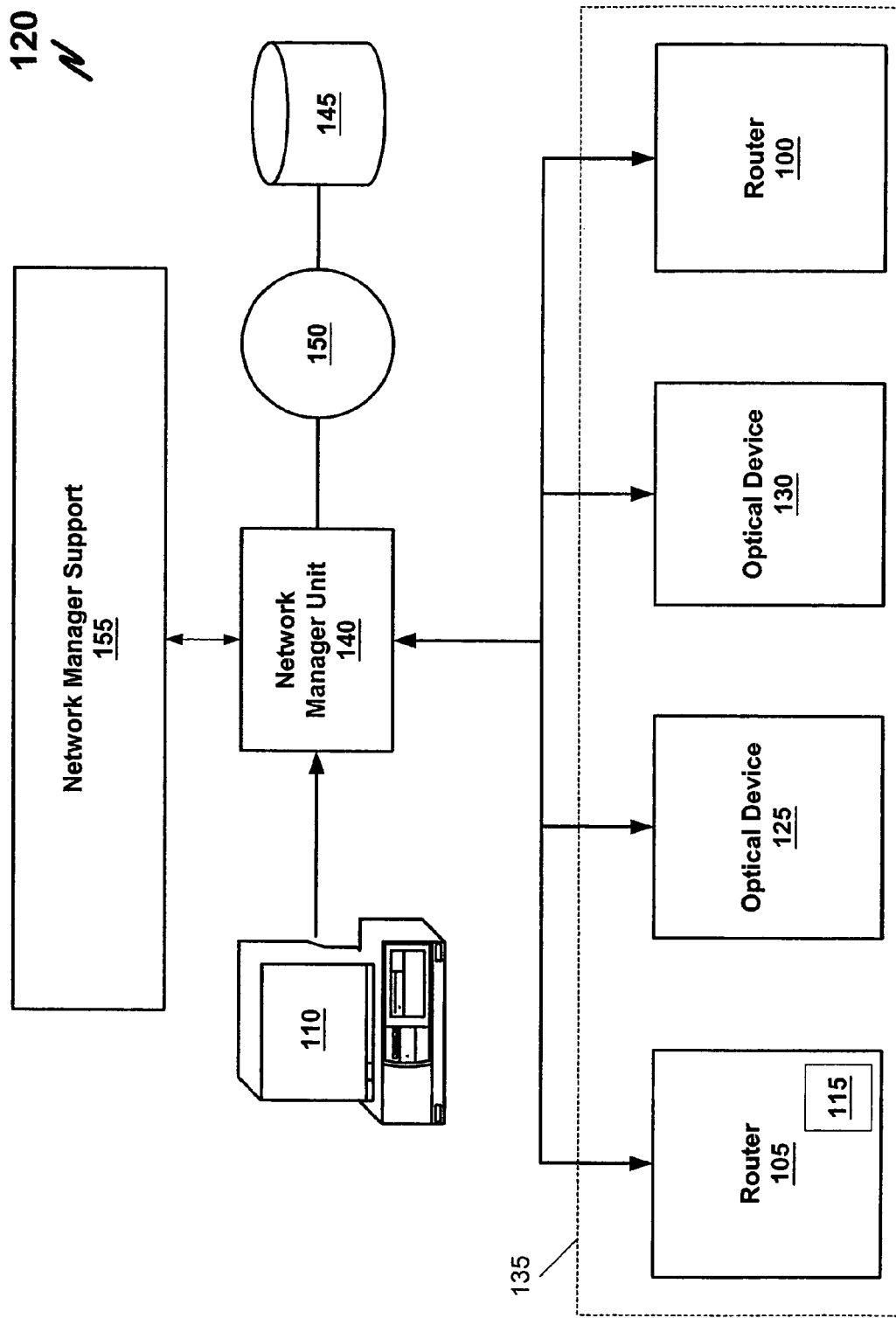
FIG. 2 illustrates a system for configuring network devices in accordance with the principles of the present invention.

Referring now to FIG. 2, there is illustrated a system 120 for configuring network devices 100, 105, 125, 130 (collectively 135) in accordance with the principles of the present invention. This embodiment includes a network manager unit 140 disposed between the administrator 110 and the network devices 135, which can include routers, optical devices, etc. The network manager unit 140 also is connected to remote storage 145 (connected by network 150) and a network manager support 155.

To alter the configuration of a network device 135 or to add a network device to an existing network, the administrator 110 can access the network manager unit 140, search for and retrieve the configuration record corresponding to a target network device, and through a series of interactive, wizard-like screens, change the configuration record for the target network device. This altered configuration record is stored in a central repository in the network manager unit 140 and can be checked against network policies accessible by the network manager unit 140. Next, the network manager unit 140 can generate device-specific commands from the new configuration record and push those device-specific commands to the target network device or have the target network device pull the commands. Finally, the network manager unit 140 can verify that the new configuration was installed correctly at the target network device.

To generate the necessary device-specific commands, the network manager unit 140 may access the remote storage device 145 that can contain the various templates needed to generate device-specific commands for different types, brands, and/or models of network devices. Each of these templates can contain variable fields corresponding to either information stored in the configuration records or information input directly by the administrator. The network manager unit 140 generates the device-specific commands by retrieving the appropriate template and filling in the variable fields with the data from the configuration records and/or data input directly by the administrator 110. Once generated, these device-specific commands can be stored in the configuration record and/or they can be stored in the remote storage device 145 with an appropriate pointer stored in the configuration record.

As can be appreciated by those skilled in the art, the network manager unit 140 can be implemented on virtually any hardware system. Good results, however, have been achieved using components running the Red Hat™ LINUX Operating System and the Sun Solaris™ UNIX Operating System. In embodiments running either of these operating systems, the network manager unit 140 preferably is configured to utilize the common services provided by that particular operating system.

Figure 3:
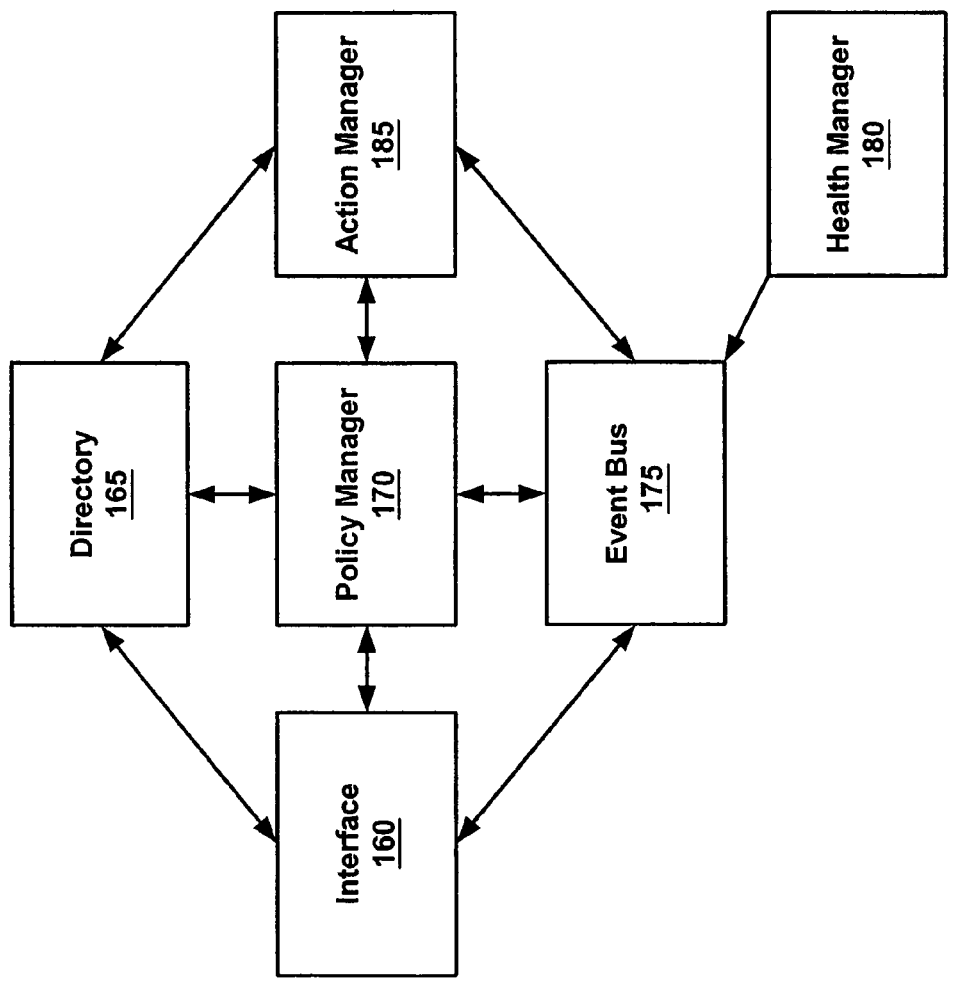
FIG. 3 illustrates in more detail the network manager unit shown in FIG. 2.

Referring now to FIG. 3, there is illustrated in more detail the network manager unit 140 shown in FIG. 2. This embodiment of the network manager unit 140 includes six basic modules: an interface 160, a directory 165, a policy manager 170, an event bus 175, a health manager 180 and an action manager 185. The illustrated connections between the various components are exemplary only. The components can be connected in a variety of ways without changing the basic operation of the system. Although the division of the network manager unit 140 into the six components is the presently preferred embodiment, the functions of these components could be subdivided, grouped together, deleted and/or supplemented so that more or less components can be utilized in any particular implementation. Thus, the network manager unit 140 can be embodied in several forms other than the one illustrated in FIG. 3.

Referring first to the interface module 160, it is designed to exchange data with the administrator 110 (shown in FIG. 2) and, in some embodiments, with the network devices 135 (also shown in FIG. 2). Although the interface 160 could implement virtually any type of interface, good results have been achieved using a graphical, web interface. Other interfaces can be based upon wireless protocols such as WAP (wireless application protocol).

The second component of the network manager unit 140 is the event bus 175. The event bus 175 includes a central posting location for receiving messages relating to network events. For example, when a configuration for a network device 135 is to be changed, an appropriate message can be published (or otherwise made available) to the event bus 175. Similarly, if a network condition such as an error occurs, an appropriate message can be published to the event bus 175. Notably, any message published to the event bus 175 can also be sent to the administrator 110 by way of the interface 160. The administrator 110, however, does not necessarily need to respond to a received message for the event to be addressed by the network manager unit 140.

To determine the proper response for a message posted to the event bus 175, the received message can be compared against the policies stored in the policy manager 170, which is a repository for the business and network policies and rules used to manage the network. By using these rules and policies, an administrator 110 (shown in FIG. 2) can define a response for any event published to the event bus 175. The defined response can be virtually anything including reconfiguring a network device, shutting down a network device and notifying an administrator.

In operation, the policy manager 170 can read a message posted to the event bus 175. Alternatively, the event bus 175 can automatically push the message to the policy manager 170. Either way, however, the policy manager 170 uses the message to access policy records that can be stored, for example, in a look-up table and to correlate the message to the appropriate response. Once the policy manager 170 has determined the appropriate response, that response is published to the event bus 175 as a work order that can be read by the action manager 185 and subsequently executed. That is, the action manager 185 can read the work order from the event bus 175 and perform the necessary tasks to complete that work order. In other embodiments, the work order can be sent directly to the action manager 185. For example, assume that the action manager 185 reads a work order from the event bus 175 that indicates two routers—one a Cisco™ router and one a Juniper™ router—need to be enabled. The action manager 185 can locate each of these routers and determine the device-specific code needed to enable them. The code required to enable the Cisco™ router, for example, might be "enable_router" and the code required to enable the Juniper™ router might be "router_enable." Because the action manager 185 determines the appropriate device-specific code, however, the administrator 110 (shown in FIG. 2) only needs to generically indicate that both devices are to be enabled. The administrator 110 does not need to know the actual device-specific code required by each router. This feature is described in greater detail with relation to FIG. 8.

In other embodiments, the action manager 185 can verify that the administrator 110 (shown in FIG. 2) has authority to make changes to network devices without authorization from additional parties. If additional authorization is required, the action manager 185 can post an appropriate message to the event bus 175.

Still referring to FIG. 3, the directory 165 of the network manager unit 140 includes a central repository for storing the configuration records of each of the network devices connected to the network manager unit 140. For example, the directory 165 could store a separate configuration record for each of network devices 100, 105, 125 and 130 shown in FIG. 2. In certain embodiments, several interconnected directories may be utilized, and in such systems, each directory can store a certain subset of the configuration records or a complete copy of all of the configuration records. Generally, such embodiments would employ multiple linked network manager units 140, and in the embodiment where complete copies of the configuration records are stored in different directories, synchronization techniques can be used to guarantee data integrity.

The configuration records stored in the directory 165 are searchable by way of the interface 160. That is, the administrator 110 or a component within the network manager 140 (shown in FIG. 2) can initiate a search through the interface 160 and the results of that search can be made available to the administrator 110 through the interface 160. Moreover, the configuration records can be searched in any of a variety of ways. For example, the configuration records can be searched according to equipment type (e.g., routers, optical devices, etc.), device type (edge router, core router, etc.), device location, device manufacturer, device model, device name, operational status, etc. The directory 165 can be used to enable directory-based networking.

Referring now to the health manager 180, it can be configured to monitor the overall health of the network and/or the health of individual network devices 135 (shown in FIG. 2) within the network. The health manager 180 can operate in an active mode and/or a passive mode. In the active mode, the health manager actively polls at least some of the network devices 135 about their status, utilization, congestion, etc. In the passive mode, the various network devices 135 automatically report to the health manager 180. In either embodiment, however, the health manager 180 can collect individual device information and model overall network health. Additionally, the health manager 180 can publish messages regarding network device problems, projected network device problems, network problems, and/or projected network problems. The policy manager 170 can then determine the appropriate course of action to take for the particular message and the action manager 185 can implement that response.

In further embodiments, the health manager can monitor the health of the network manager components. For example, the health manager can monitor the operation of the event bus, the action manager and/or the directory. Moreover, the health manager can monitor the flow of data between the various components of the network manager.

Figure 4:
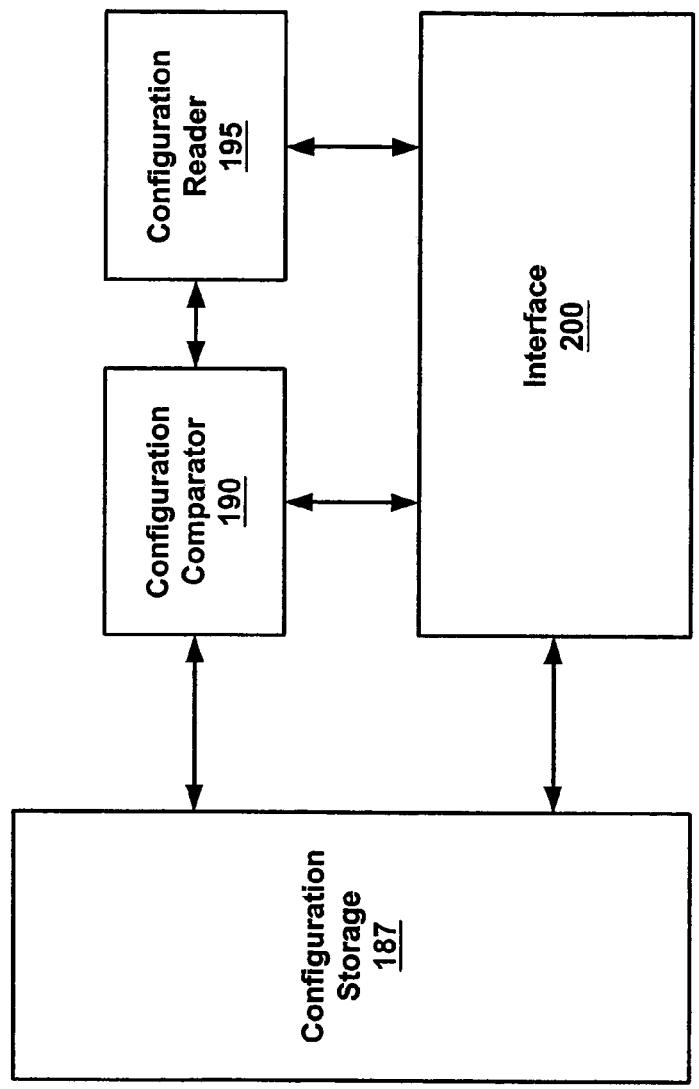
FIG. 4 illustrates in more detail the directory element shown in FIG. 3.

Referring now to FIG. 4, there is illustrated in more detail the directory 165 shown in FIG. 3. This embodiment of the directory 165 consists of four interconnected modules: configuration storage 187, configuration comparator 190, configuration reader 195 and interface 200. The directory 165, however, does not need all of the modules to function in accordance with the principles of the present invention.

The configuration reader module 195 of the directory 165 is designed to initiate communication with (or directly communicate with) a target network device and retrieve that device's actual configuration. For example, the configuration reader can retrieve the actual configuration from the memory 115 of router 105 (shown in FIG. 2). This retrieved actual configuration can then be passed to the configuration comparator 190. The configuration reader 195 can also retrieve the intended configuration of the target device from the configuration storage 187 and pass that intended configuration to the configuration comparator 190. The configuration comparator 190 can then compare the actual configuration and the intended configuration and present the differences to the administrator 110 (shown in FIG. 2). In one embodiment, the differences in the configurations are not only presented literally, but also in a natural language summary form. Once the differences have been identified, they can be used to identify a failed configuration installation and/or to aid the administrator in creating the proper configuration for a device.

As previously discussed, the configuration storage 187 is designed to store configuration records corresponding to network devices such as network devices 135 shown in FIG.

2. In one embodiment the configuration storage 187 is designed not only to store the present configuration record for a network device, but also to store previous configuration records for that device. By storing these previous configurations, fault recovery and correction are vastly improved over present systems because prior, successful configurations can be quickly retrieved and used to replace new, faulty configurations. For example, a prior configuration of a previously known good state can be retrieved and installed on the associated network device. This prior configuration could be days old or even weeks old. Prior configuration records can be distinguished by version numbers and/or a time stamp. Additionally, each configuration record can include a searchable summary that includes notes on the configuration and why that configuration was modified.

Figure 5:
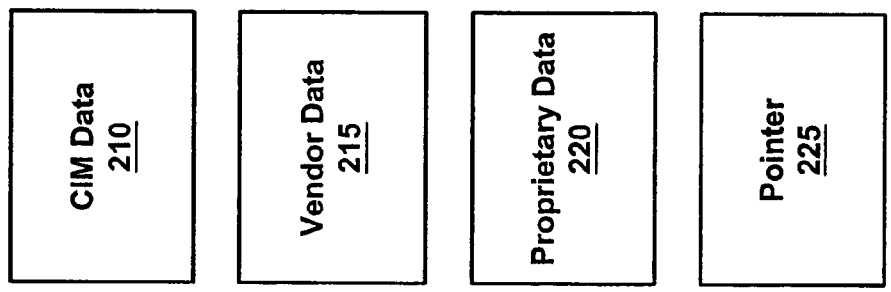
FIG. 5 illustrates a configuration record for a typical network device in accordance with the present invention.

Referring now to FIG. 5, there is illustrated a configuration record 205 for a typical network device. This configuration record 205 is divided into four portions: a common information model ("CIM") data portion 210, a vendor data portion 215, proprietary data portion 220 and a data pointer 225. The CIM data portion 210 contains data relating to the physical attributes of a particular network device such as name, device type, number of interfaces, capacity, etc. The CIM data items are defined in the CIM Specification v2.2 and the CIM Schema v2.4, both of which are well known in the art and incorporated herein by reference.

The vendor data portion 215 of the configuration record contains standard vendor-specific data regarding the particular network device. For example, the vendor data portion 215 could indicate which version of an operating system that the network device is running or which features of the device are enabled. Generally, the data in the vendor data portion 215 is specific to each manufacturer and even to each model of network device.

The proprietary data portion 220 of the configuration record can contain data used by the network manager unit in configuring and managing the network devices. In one embodiment, for example, the proprietary data portion 220 includes a pointer to an address at which a core dump for a network device is stored. That is, if a router initiates a core dump, the location of that core dump could be recorded in the proprietary data portion 220 of the configuration record for that router. In other embodiments, the proprietary data portion 220 can store version numbers, time stamps, health records for a particular configuration, configuration summary data, configuration notes, etc.

The pointer portion 225 of the configuration record 205 can be used to point to a storage location where the actual device-specific commands for the associated network device are stored. Similarly, the pointer 225 could be configured to point to a storage location for a device-specific template for configuring a newly installed network device. In other embodiments, the pointer portion 225 of the configuration record can be supplemented or replaced with a storage location for actual device-specific code.

Figure 6:
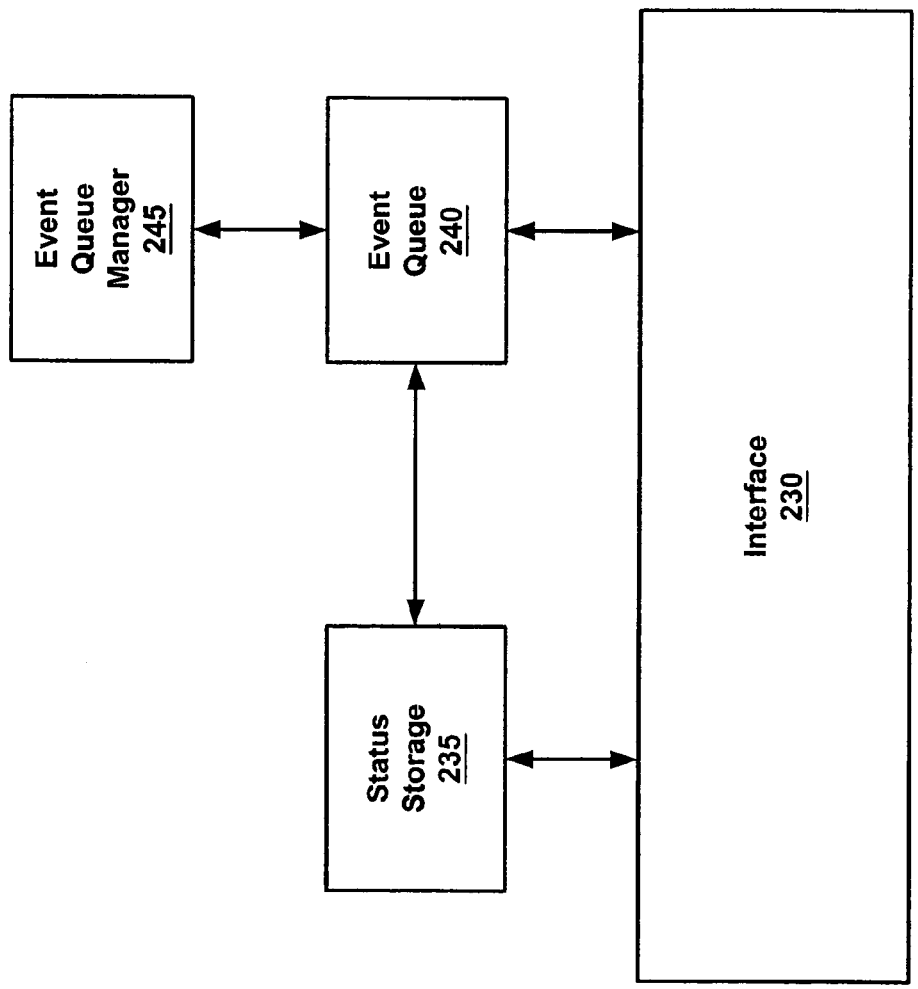
FIG. 6 illustrates in more detail the event bus shown in FIG. 3.

Referring now to FIG. 6, there is illustrated in more detail the event bus 175 shown in FIG. 3. As previously described, the event bus 175 is a posting location for messages relating to network events. Network devices as well as the other components of the network manager unit 140 (shown in FIG. 2) can address and post events to the event bus 175.

The particular embodiment of the event bus 175 shown in FIG. 6 is comprised of four basic modules: an interface 230, a status storage 235, an event queue 240, and an event queue manager 245. In operation, a message indicating the occurrence of a network event is posted to the event queue 240 by way of the interface 230. The messages stored at the event queue 240 are then made available to the policy manager 170 (shown in FIG. 3), so that a proper response can be determined. If the posted message is a work order from the policy manager 170, the work order is made available to the action manager 185 (shown in FIG. 3) for subsequent implementation.

In one embodiment of the event bus 175, an event message is stored in status storage 235 along with a status field and an age field. Thus, for any message posted to the event bus 175, its status and age can be continuously monitored. (The event bus can also get messages from client devices.) For example, status storage 235 could indicate that the status for a particular event is pending in the action manager 185 (shown in FIG. 3), awaiting proper authorization, authorization completed, stalled, etc. As the status changes from one status to another, appropriate messages can be generated and posted at the event queue 240. For example, if the status of an event changes from pending to stalled, an appropriate message can be posted to the event queue 240 so that the policy manager 170 can determine how to respond. Similarly, if the age field in the status storage 235 indicates that a particular network event has not been addressed within a predetermined amount of time, that event can be requeued, deleted from the event queue 240, or a new event notification indicating the delay can be generated and placed on the event queue 240.

Figure 7:
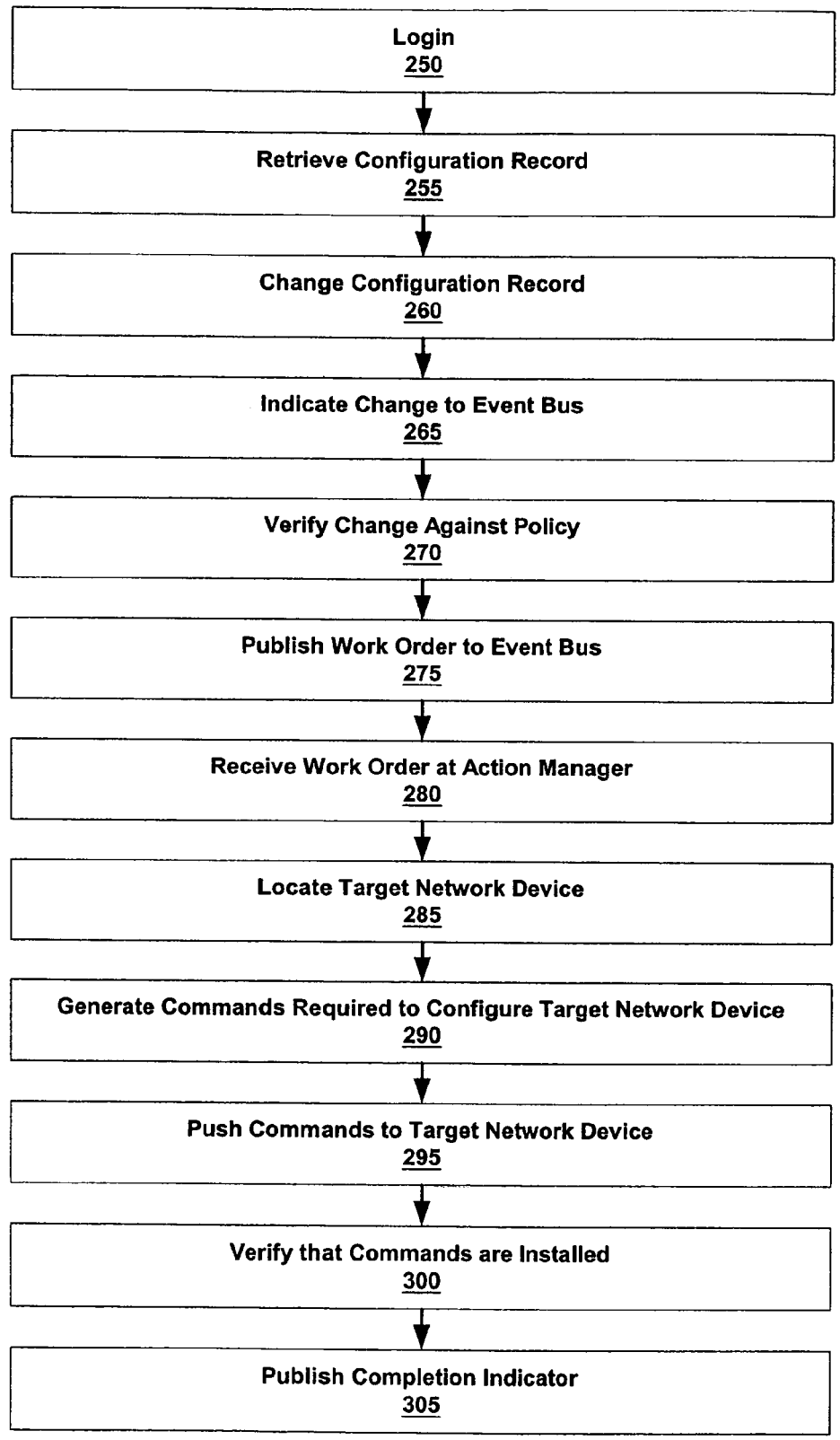
FIG. 7 is a flow chart of a method for configuring a network device in accordance with the present invention.

Referring now to FIG. 7, there is a flow chart of one method for configuring or reconfiguring a network device in accordance with the principles of the present invention. In this embodiment, the administrator 110 (shown in FIG. 2) initially logs in to the network manager unit 140 (Step 250). Through a series of a graphical interfaces (such as the global GUI in FIG. 8), the administrator 110 can select a network device that needs to be configured or reconfigured. The configuration record associated with the selected device can then be retrieved from the directory 165 (shown in FIG. 3) and presented to the administrator (Step 255). If no configuration record is available for a selected device, the administrator 110 will be guided through a series of steps to build the configuration for that device. Otherwise, the administrator 110 can change parameters within the configuration record of the selected device and save those altered configuration records within the directory 165 (Step 260). Notably, even though the configuration record for the selected network device has been changed, the actual configuration of the device has not been changed. Before the configuration of the device can be changed, an event message indicating that a configuration record has been altered should be published to the event bus 175 (shown in FIG. 3) (Step 265). The policy manager 170 (shown in FIG. 3) then receives the event message, either by reading it from the event bus 175 or by receiving it from the event bus 175, and determines if the configuration change is authorized (Step 270). If the configuration change is within the network rules and the administrator 110 (shown in FIG. 2) is authorized to make the change, a work order is published to the event bus (Step 280). The action manager 185 (shown in FIG. 3) can then read the work order from the event bus 175 and carry out the necessary steps to implement the work order (Step 280).

In one embodiment, the action manager 185 (shown in FIG. 3) carries out the work order by locating the target network device, retrieving the appropriate configuration record from the directory 165 (shown in FIG. 3), generating the device-specific code corresponding to the altered configuration (Step 290), and pushing the device-specific code to the target network device (Step 295). The action manger

185 can also store the device-specific code in a remote storage device, such as remote storage device 145 shown in FIG. 2, and a pointer to the remote storage device can be recorded in the configuration record. Finally, the action manager 185 can verify that the device-specific code was properly transferred to the selected network device and that the network device is behaving accordingly (Step 300). Assuming that the device-specific codes were installed correctly and that the network device is operating properly, a completion message is published to the event bus 175 (shown in FIG. 3) (Step 305).

Figure 8:
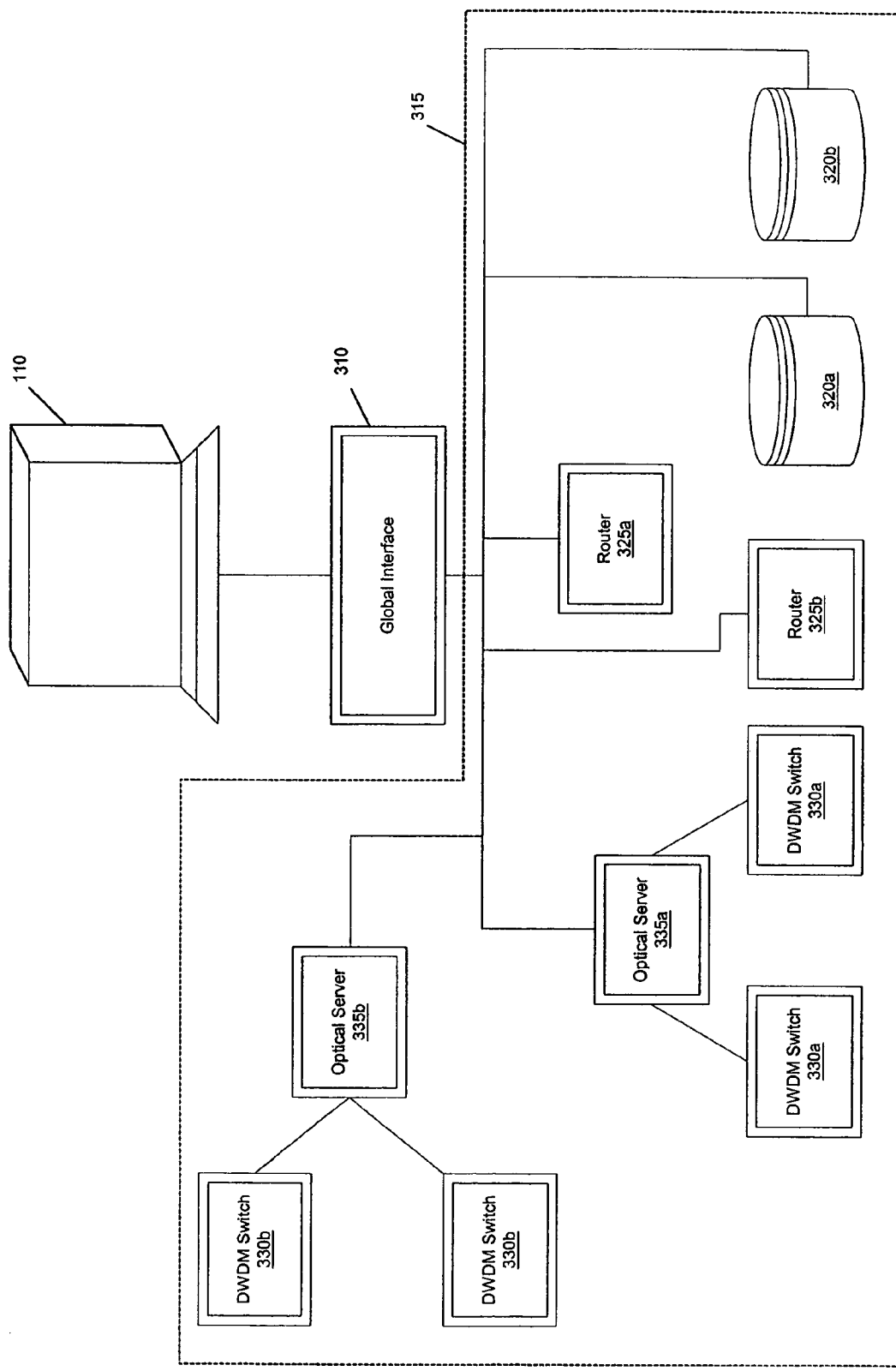
FIG. 8 illustrates a network system with an integrated global graphical user interface.

Referring now to FIG. 8, there is illustrated a network system with an integrated global graphical user interface (GUI 310). In this embodiment, a global GUI 310 is disposed between the network administrator 110 and various network devices (collectively 315). These network devices include storage devices 320a and 320b, routers 325a and 325b, and DWDM (dense wave division multiplexing) switches 330a and 330b connected to optical servers 335a and 335b. Notably, the network devices of the same type can be manufactured by different manufacturers. For example, router 325a can be manufactured by Cisco™ and router 325b can be manufactured by Juniper™.

As previously discussed, in present network systems, a network administrator 110 could be required to navigate different communication interfaces for each of the network devices 315. Thus, for network system x, a network administrator 110 without the benefit of the present invention could be forced to learn six distinct interfaces. Through the present invention, however, the network administrator 110 can communicate with any of the network devices 315 by navigating the global GUI 310, which presents the network administrator 110 with a familiar graphical interface that has a similar look and feel for all network devices 315, regardless of device type or manufacturer.

Figure 9:
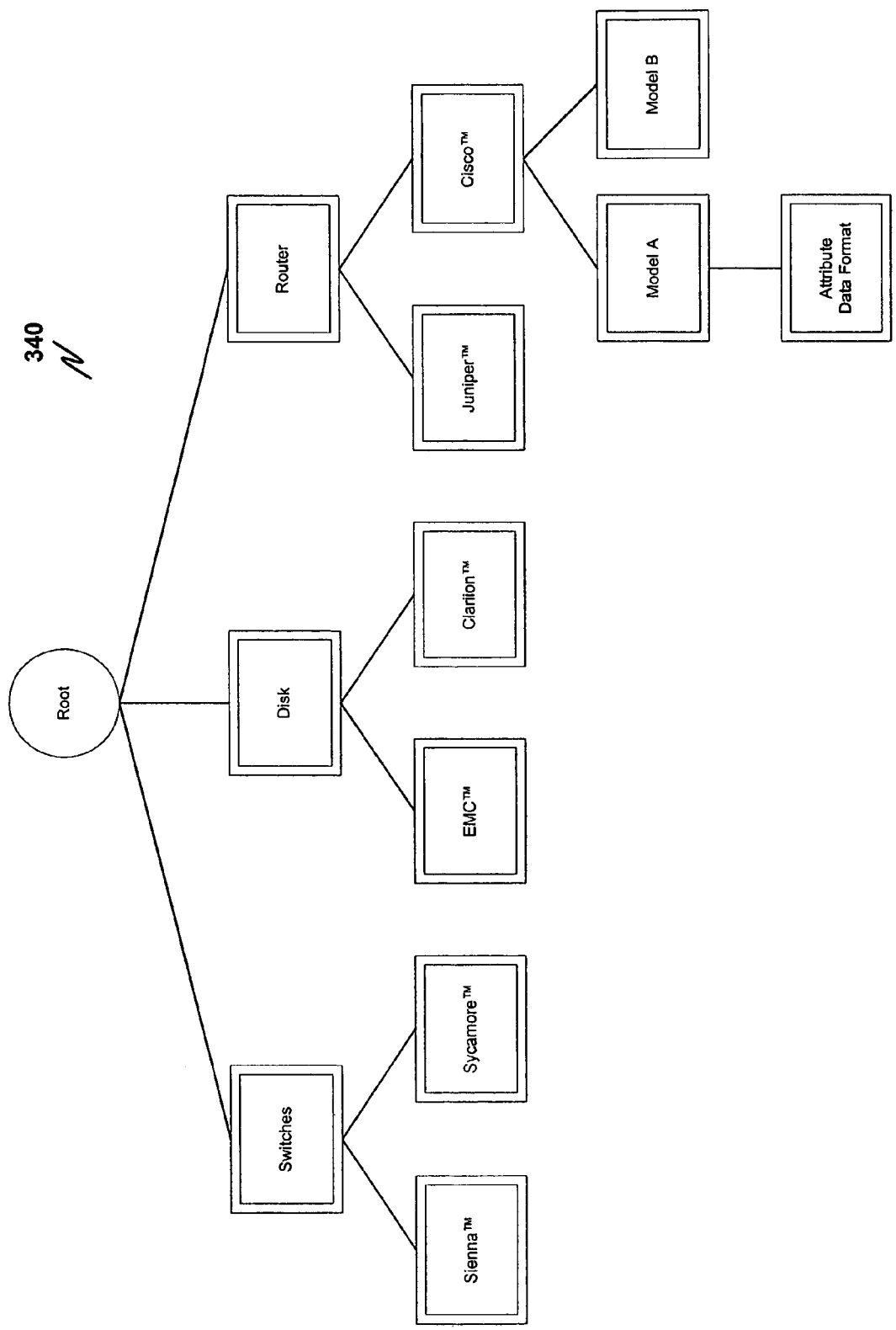
FIG. 9 illustrates a directory tree for managing network device templates.

Configuration and reconfiguration of a network device requires that certain attributes be provided to the network device. For different types and manufacturers of devices, these attributes and their formats can vary. DWDM switches, for example, require a wavelength attribute that routers do not. Moreover, one DWDM manufacturer may require the wavelength in a first format, and a second manufacturer may require the same information in a second format. Thus, the global GUI 310 can include both attributes and formatting instructions associated with each of the network devices 315. Good results have been achieved by arranging these attributes and/or formatting instructions in a directory tree 340 such as the one shown in FIG. 9. In this directory tree 340, the attributes and/or formatting instructions for a model A, Cisco™ router can be located by traversing the tree from the root to the router node to the Cisco™ node to the Model A leaf. The appropriate attributes and/or formatting instructions can be located from the Model A leaf.

To populate the attribute fields, the global GUI 310 could prompt the network administrator 110 for the necessary information. Once the global GUI 310 has acquired the necessary information, the information can be properly formatted—in accordance with the formatting instructions—and passed to the appropriate network device. In the presently preferred embodiment, the global GUI 310 formats the attribute data for a particular network device into a frame that includes a header portion and a payload portion. The header portion can include routing instructions in various formats including HTTP, and the payload portion can include the attribute data in various formats including XML. Additionally, the attribute data can be ordered within the payload according to the formatting instructions. When a network device receives a frame from the global GUI, it can extract the attribute data from the payload and use that data as if it had been received through the network device's own interface. Notably, the frame can be stored on virtually any computer media and/or can exist as an electronically altered signal—collectively referred to as a "computer program product." (A "computer program product" refers to any media that may be used to provide programming instructions or data to an electronic system. A computer program product includes, but is not limited to, any memory device (whether fixed or removable), any storage medium, and/or any electronically altered signals that carry data.)

By using the present invention, a network administrator 110 need only learn to navigate the global GUI 310 and not the individual GUIs for the various network devices. Because the present invention allows network devices 315 to be configured and reconfigured without regard to their type or manufacturer, network administrators 110 will be able to add network devices to their network even when they are otherwise unfamiliar with the means for communicating with that type/brand of device. Additionally, the present invention will increase competition in the network device market because new device manufactures will be able to enter the market without first training network administrators to use their products. Moreover, the present invention will reduce network provider costs because fewer specialized administrators will be needed to communicate with the various types of devices.

Although the global GUI 310 can be operated independently of the network manager unit 140 (shown in FIG. 2), good results are expected when the two components are integrated. For example, the global GUI 310 could be used to alter the centrally stored configuration record for a network device. In fact, the templates used by the global GUI 310 can be associated with or even integrated with the configuration records stored in the directory 165 (shown in FIG. 3) of the network manager unit. For example, the data pointer 225 (shown in FIG. 5) could point to a corresponding template in the global GUI 310.

The information stored in a configuration record 205 can be used to populate the attribute fields for a network device's template. In other words, the network manager unit 140 (shown in FIG. 5) could retrieve the template for a particular network device, populate the attribute fields of that retrieved template with information from the device's configuration record, format the attribute fields into a frame and pass that frame to the network device. This frame, in some embodiments, constitutes the device-specific commands required to configure the network device.

In conclusion, the present system provides, among other things, a method and apparatus to configure, monitor and manage network devices without regard for device type and/or manufacturer. Those skilled in the art, however, can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for communicating with a network device, the method comprising:
   receiving a message indicating a network event has occurred, the network event affecting communications among the network device and other network devices;
   comparing the network event with a collection of policies to determine a response to the network event;
   retrieving a command-format template corresponding to the network device, wherein the command-format template indicates how to construct a device-specific command for the network device and includes an attribute field;
   identifying, in accord with the determined response to the network event, attribute data corresponding to the attribute field;
   generating the device-specific command for the network device using the retrieved command-format template and the identified attribute data; and
   providing the generated device-specific command to the network device.

2. The method of claim 1, wherein the step of retrieving the command-format template comprises the step of:
   retrieving the command-format template from a central repository, wherein the central repository is configured to store a plurality of command-format templates, each of which correspond to at least one of a plurality of network devices.

3. The method of claim 2, wherein the step of retrieving the command-format template comprises the step of:
   traversing a data repository to identify the command-format template in the plurality of command-format templates that corresponds to the received network device identifier.

4. The method of claim 1, wherein the step of retrieving the command-format template comprises the step of:
   retrieving formatting data associated with the command-format template.

5. The method of claim 1, wherein the step of populating the attribute field comprises the step of:
   receiving the attribute data from a network administrator.

6. The method of claim 1, wherein the step of populating the attribute field comprises the step of:
   receiving the attribute data from a network information system.

7. The method of claim 1, wherein the generating the device-specific command comprises the step of:
   forming an XML message comprising at least an indication of the formatted attribute data.

8. The method of claim 7, wherein the generating the device-specific command comprises the step of:
   forming an HTTP message comprising at least an indication of the network device identifier.

9. The method of claim 8, wherein generating the device-specific command comprises the step of:
   forming a frame comprising the XML message and the HTTP message.

10. The method of claim 1, wherein generating the device-specific command comprises the step of:
    forming a frame comprising at least an indication of the formatted attribute data and at least an indication of the network device identifier; and
    comparing the generated frame to a desired configuration template result.

11. The method of claim 10, wherein the step of providing the generated device-specific command to the network device comprises the step of:
    pushing the frame to the network device.

12. The method of claim 10, further comprising the step of:
    extracting the attribute data from the frame.

13. The method of claim 12, further comprising:
    altering the operation of the network device in accordance with a desired configuration template so as to generate an altered configuration record;
    comparing the altered configuration record to an expected altered configuration template;
    returning the network device to a previous operational state if the comparing indicates the alteration is not implemented correctly; and
    storing the altered configuration record in a data repository.

* * * * *

UNITED STATES PATENT AND TRADEMARK OFFICE
CERTIFICATE OF CORRECTION

| | | |
|---|---|---|
| PATENT NO. | : 7,246,162 B2 | |
| APPLICATION NO. | : 11/216481 | |
| DATED | : July 17, 2007 | |
| INVENTOR(S) | : Glen D. Tindal | |

It is certified that error appears in the above-identified patent and that said Letters Patent is hereby corrected as shown below:

Please add the following to the face of the patent, Item (63) to read

--Related U.S. Application Data

(63) This application is a continuation of 09/799,579, filed on Mar. 6, 2001, now Pat. No. 6,978,301, which is a continuation-in-part of application No. 09/730,864, filed on Dec. 6, 2000, now Pat. No. 7,249,170, and a continuation-in-part of application No. 07/730,680, filed Dec. 6, 2000, and a continuation-in-part of application No. 09/730,863, filed Dec. 6, 2000, and a continuation-in-part of application No. 09/730,671, filed Dec. 6, 2000, now Pat. No. 7,054,946, and a continuation-in-part of application No. 09/730,682, filed Dec. 6, 2000--.

Please add to the written description at Column 1, line 9 after "now U.S. Pat. No. 6,978,301" the following domestic priority data:

--, which is a continuation-in-part of application No. 09/730,864, entitled System and Method for Configuration, Management and Monitoring of Network Resources, filed on Dec. 6, 2000, now Pat. No. 7,249,170, and a continuation-in-part of application No. 07/730,680, entitled System and method for Redirecting Data Generated by Network Devices, filed Dec. 6, 2000, and a continuation-in-part of application No. 09/730,863, entitled Event Manager for Network Operating System, filed Dec. 6, 2000, and a continuation-in-part of application No. 09/730,671, entitled Dynamic Configuration of Network Devices to Enable Data Transfers, filed Dec. 6, 2000, now Pat. No. 7,054,946, and a continuation-in-part of application No. 09/730,682, entitled Network Operating System Data Directory, filed Dec. 6, 2000--.

Signed and Sealed this

Fourteenth Day of April, 2009

JOHN DOLL
*Acting Director of the United States Patent and Trademark Office*